(12) United States Patent
Mathiasen

(10) Patent No.: US 7,920,560 B2
(45) Date of Patent: Apr. 5, 2011

(54) METHOD FOR DETECTING TOPOLOGY OF COMPUTER SYSTEMS

(75) Inventor: Torben Mathiasen, Faxe (DK)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 12/108,474

(22) Filed: Apr. 23, 2008

(65) Prior Publication Data

US 2008/0310410 A1    Dec. 18, 2008

Related U.S. Application Data

(60) Provisional application No. 60/943,420, filed on Jun. 12, 2007.

(51) Int. Cl.
*H04L 12/28*    (2006.01)
(52) U.S. Cl. ........................................ 370/389; 370/216
(58) Field of Classification Search .................. 370/328, 370/401, 254, 389; 717/106
See application file for complete search history.

(56) References Cited

U.S. PATENT DOCUMENTS

| | | | |
|---|---|---|---|
| 6,104,695 A * | 8/2000 | Wesley et al. ................. | 370/216 |
| 6,426,947 B1 * | 7/2002 | Banker et al. ................. | 370/254 |
| 6,526,044 B1 * | 2/2003 | Cookmeyer et al. .......... | 370/352 |
| 6,631,136 B1 * | 10/2003 | Chowdhury et al. ..... | 370/395.31 |
| 6,940,863 B2 * | 9/2005 | Xue et al. ....................... | 370/401 |
| 7,346,704 B2 * | 3/2008 | Roadknight et al. .......... | 709/238 |
| 7,403,492 B2 * | 7/2008 | Zeng et al. ..................... | 370/254 |
| 7,415,018 B2 * | 8/2008 | Jones et al. .................... | 370/392 |
| 7,480,292 B2 * | 1/2009 | Busi et al. ...................... | 370/389 |
| 7,483,395 B2 * | 1/2009 | Iwanaga et al. ............... | 370/254 |
| 7,496,044 B1 * | 2/2009 | Wing ............................. | 370/242 |
| 7,535,834 B2 * | 5/2009 | Honma et al. ................. | 370/229 |
| 7,564,869 B2 * | 7/2009 | Cafiero et al. ................. | 370/466 |
| 7,567,547 B2 * | 7/2009 | Mosko et al. ................. | 370/351 |
| 7,602,817 B2 * | 10/2009 | Ramalho ....................... | 370/527 |
| 7,619,987 B2 * | 11/2009 | Mitsumori .................... | 370/254 |
| 2006/0002386 A1 * | 1/2006 | Yik et al. ....................... | 370/389 |
| 2006/0045011 A1 * | 3/2006 | Aghvami et al. ............. | 370/230 |
| 2008/0092113 A1 * | 4/2008 | Weinstein et al. ............ | 717/106 |
| 2008/0186907 A1 * | 8/2008 | Yagyuu et al. ................ | 370/328 |

* cited by examiner

*Primary Examiner* — Thong H Vu

(57) ABSTRACT

One embodiment is a method that transmits a packet having a bit field with a Time-to-live (TTL) value from a requesting node to a plurality of receiving nodes. The TTL value is decreased at each of the receiving nodes, and the packet is sent back to the requesting node that compares a value in the bit field with the TTL value to determine a topology of the receiving nodes connected to the requesting node.

20 Claims, 4 Drawing Sheets

METHOD FOR DETECTING TOPOLOGY OF COMPUTER SYSTEMS

CROSS-REFERENCE TO RELATED APPLICATION

This application incorporates by reference and claims priority to provisional patent application having Ser. No. 60/943,420 entitled "Method for Detecting Topology of Computer Systems Connected Using Network Bridges" and filed on Jun. 12, 2007.

BACKGROUND

Computer systems are often installed in a rack and vertically or horizontally stacked together. Servers or blade computers, for example, can be stacked together in a rack and positioned in a cabinet or enclosure. In some instances, many racks are housed together in a data center which can include hundreds or thousands of servers and networked devices.

In order to manage large computer systems, an administrator is provided with a topology or mapping of the servers, blades, or other networked devices in the computer system. A topology map shows where each server or blade is located in the computer system. This topology, however, often changes as individual servers, blades, and other networked devices are added and removed from the computer system. The topology map needs to accurately and timely determine when such changes occur to the computer system. Otherwise, the administrator will not have an accurate mapping of the devices in the computer system

DETAILED DESCRIPTION

Embodiments are directed to systems, methods, and apparatus for detecting a topology of nodes in a computer system. One embodiment uses a method to detect and map a topology of networked computer systems or nodes that are connected by software network bridges. Each bridge will intercept and modify a Time-To-Live (TTL) bit field of Internet Protocol (IP) packets. These packets, in turn, are probed by software running on the computer systems or nodes to determine network topology.

In one embodiment, computer systems or nodes are installed in a rack and managed using software executing on the computer systems themselves. Software executing on a single computer system can manage all computer systems in the rack. To improve a visual overview of the rack mounted systems, exemplary embodiments present a topological map. This map shows where each computer system is located with respect to the other computer systems in the rack or in a larger system, such as a data center. The topology can be detected and calculated on the fly or in real-time as updates to the rack or system are added or removed. For instance, as individual servers are added and removed from a rack (for example hot-plugged or hot-swapped to or from the rack), exemplary embodiments detect these modifications and report them as an updated topology of the system.

One embodiment provides a cost effective and reliable way for a computer system in a rack or data center to detect a topology of all systems installed without nonstandard or special hardware being used in the system.

Exemplary embodiments described herein are applicable to any networked environment, and will generate a topology map of entire networks, not just single or multiple racks. The description focuses on an exemplary embodiment of multiple rack mounted systems, but should not be construed to limit application to such embodiment.

Figure 1:
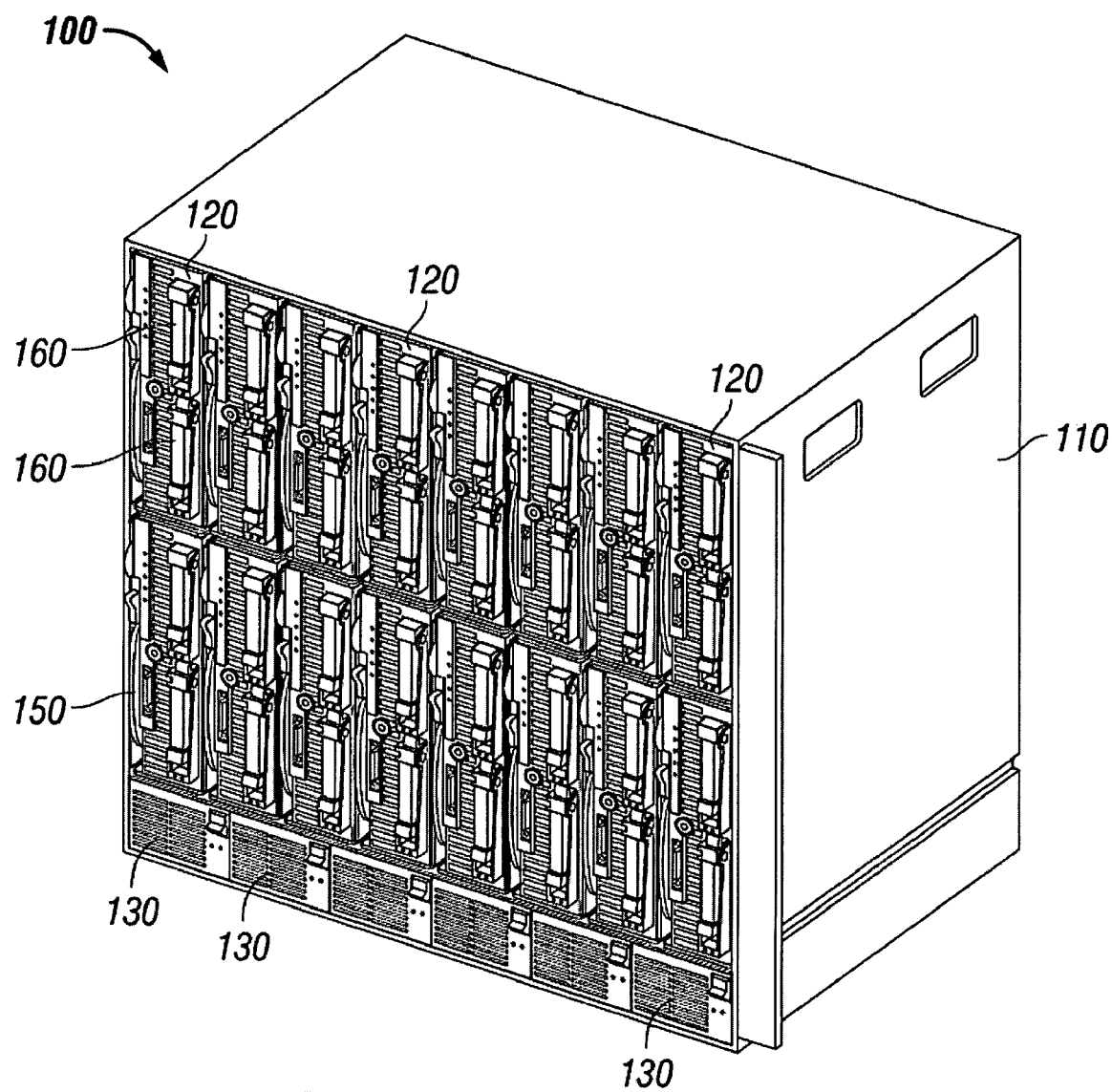
FIG. 1 is a perspective view of a computer system in accordance with an exemplary embodiment of the present invention.

FIG. 1 shows a computer system 100 in accordance with an exemplary embodiment of the present invention. The system 100 includes a rack or an enclosure 110 housing a number of compute nodes 120, such as computer systems, servers, memories, hard drives, etc. For illustration, the compute nodes 120 are depicted as comprising servers or blade computers arranged in horizontal and vertical alignment with respect to each other in the enclosure 110. The compute nodes 120 are also depicted as including various components to form part of conventional electronic systems, such as various connectors, buttons, indicators, etc. In addition to the compute nodes 120, the enclosure 110 includes other components, such as one or more power supplies 130.

For illustration, each compute node 120 includes a handle 150 and one or more hard disk drives 160. The handle enables a user to remove the compute node from the enclosure and hot-swap individual blades or servers to and from the rack.

Although sixteen compute nodes 120 and six power supplies 130 are illustrated as being contained in the enclosure 110, any reasonably suitable number of compute nodes 120 and power supplies 130 can be included in the enclosure without departing from a scope of the invention. In addition, the computer system 100 can include additional components, and some of the components depicted can be removed and/or modified without departing from exemplary embodiments.

It should also be understood that various embodiments of the invention are practiced in computer systems, storage systems, and other electronic environments having different configurations than the system 100 depicted in FIG. 1. By way of example, various embodiments of the invention are practiced in electronic environments having different types of compute nodes 120, for instance, in electronic environments having horizontally and/or vertically arranged servers.

Various embodiments of the invention are further practiced in systems and electronic environments containing a relatively larger number of compute nodes 120. For instance, various embodiments of the invention are practiced amongst compute nodes contained in a data center or compute nodes positioned at different geographic locations with respect to each other. The different geographic locations include, for instance, different rooms, different buildings, different counties, different countries, etc.

Figure 2:
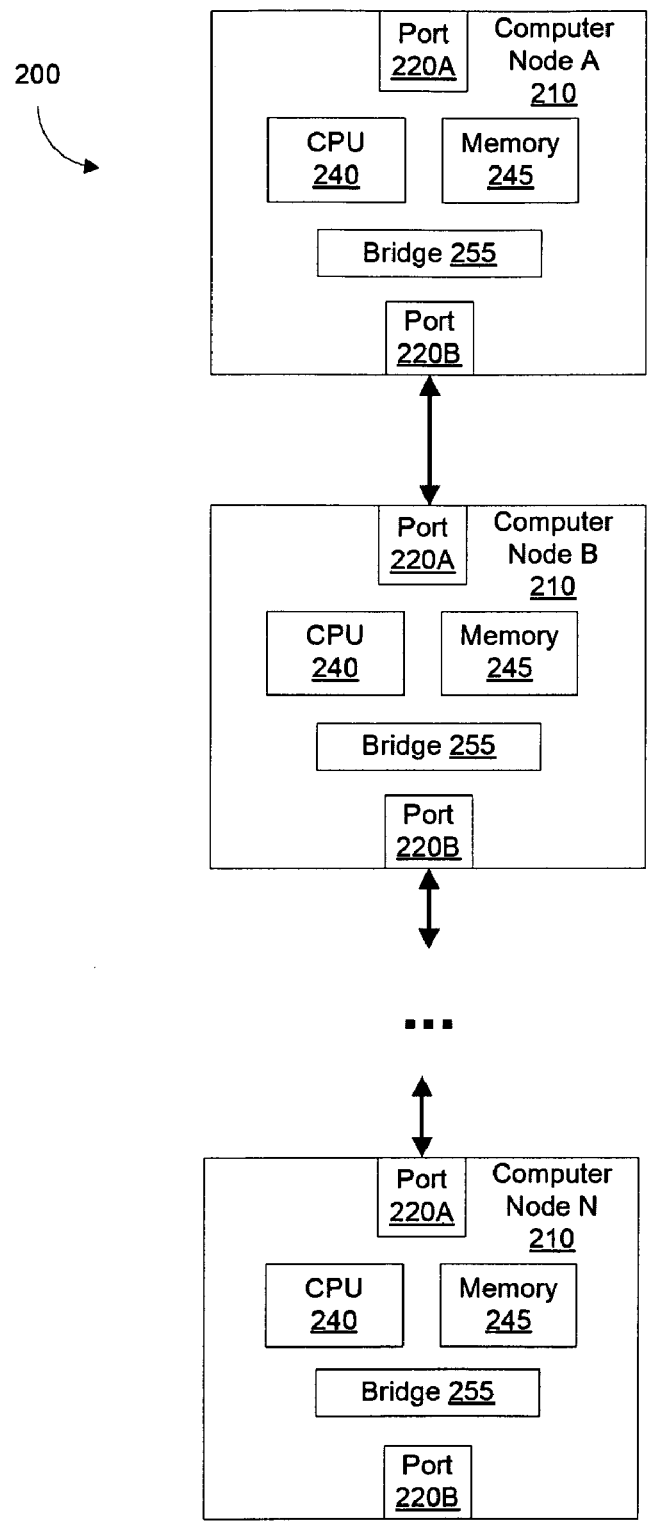
FIG. 2 is a diagram of a plurality of nodes connected to each other in accordance with an exemplary embodiment of the invention.

FIG. 2 is a diagram of a computer system 200 having a plurality of computer nodes 210 (shown as computer node A, computer node B, . . . to computer node N) connected to each other in accordance with an exemplary embodiment of the invention. Each computer node 210 includes a plurality of ports 220, a central processing unit or processor 240, memory 245, and bridge 255.

As shown, each compute node includes at least a first port 220A (such as an uplink or upstream port) and a second port 220B (such as a downlink or downstream port). These ports are linked or coupled together so the computer nodes can transmit data packets to each other. For example, the downlink port 210B of computer node A is linked to the uplink port 210A of computer node B. In turn, the downlink port of computer node B is linked to the uplink port of computer node C (not shown), etc. until the last or final computer node N or end node is reached. In this way, packets can be transmitted (for example, in a daisy-chain fashion) through a computer rack to all of the computer nodes.

The following example illustrates one exemplary embodiment: Consider N computer systems or nodes installed in a rack. Each computer system has an uplink network port and a downlink network port. Further, each system runs or executes a software network bridge that bridges packets between these two ports. Each system is also connected to a neighbor system by connecting the uplink port to a neighbor systems downlink port. Each end point in the rack will only have one of its uplink or downlink ports connected to a neighbor system. When all systems are connected in a rack, the top system will only have its downlink port connected to a neighbor and the bottom system will only have its uplink port connected to a neighbor (such as in a daisy-chained setup). Each network bridge can forward network packets from its immediate neighbor in both directions as a normal layer 2 bridge.

In one embodiment, network topology detection is accomplished by intercepting and modifying the TTL bit field of IP network packets being bridged between the various computer systems or nodes. The IP TTL value is normally used by network routers to determine when a packet is looping on the network, meaning it will subtract 1 from the TTL value whenever it routes the packet. When this counter reaches 0 the packet will be discarded.

Network bridges in accordance with exemplary embodiments, however, do not use the TTL value in this manner since the bridged network is considered a single network LAN. By modifying the network bridge to subtract 1 from the TTL value, the topology of the network is determined every time the bridge is bridging an IP packet between two computer system neighbors. Software running on each computer system or node in the rack will then periodically send IP network packets to all other systems in the rack to detect their position by looking at the TTL values in the reply packet to calculate hop count. With this setup, any computer system or node in the rack can detect the topology (position of its neighbor systems).

Figure 3:
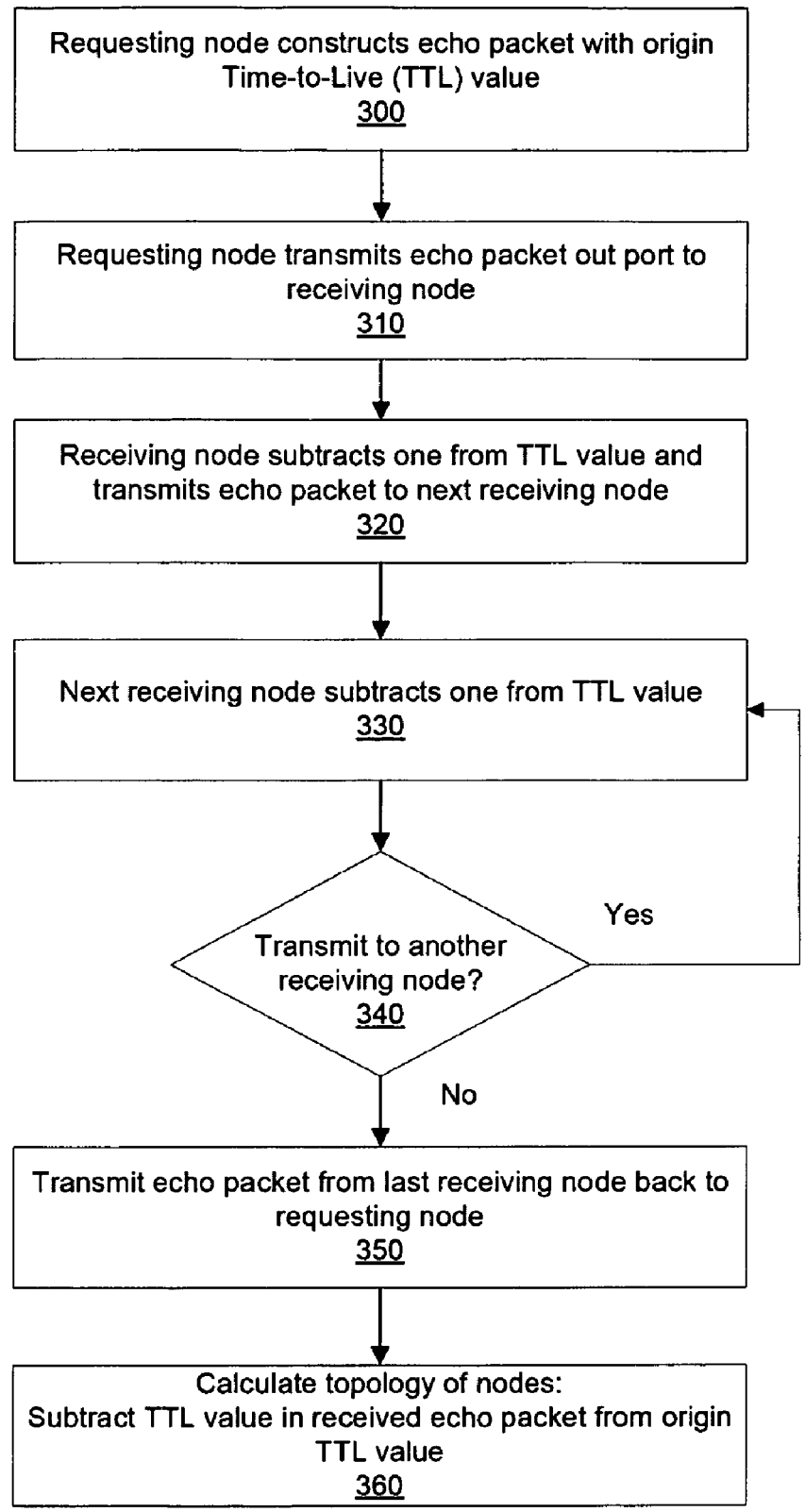
FIG. 3 is a flow diagram for determining a topology of nodes in a computer system in accordance with an exemplary embodiment of the invention.

FIG. 3 is a flow diagram for determining a topology of nodes in a computer system in accordance with an exemplary embodiment of the invention. For illustration, FIG. 3 is discussed in connection with detecting the topology of the entire rack (for example, the embodiments shown in FIG. 1 or 2) or larger systems (for example, a data center shown in FIG. 4).

According to block 300, a requesting node constructs an echo packet with an origin Time-to-Live (TTL) value. By way of example, a server or computer in a computer system constructs an IP Internet Control Message Protocol (ICMP) echo request network packet with a predefined TTL value.

According to block 310, the requesting node transmits the echo packet from its port to a receiving node. For example, the requesting nodes sends the packet from its upstream or downstream port to all computer systems or nodes in the rack that are located above (for the upstream port) or below (for the downstream port) the requesting node. In other words, the packet is sent from an upstream port of the requesting node to a downstream port of a neighboring node, or from a downstream port of the requesting node to an upstream port of a neighboring node.

According to block 320, the receiving node receives the echo packet, subtracts a value of one from the TTL value, and then transmits the echo packet to the next receiving node.

According to block 330, the next receiving node receives the echo packet and subtracts a value of one from the TTL value. Then according to block 340, a question is asked whether the echo packet will be transmitted to another receiving node. If the answer to this question is "yes" then flow proceeds to block 330. If the answer to this question is "no" then flow proceeds to block 350. Thus, each of the other computer systems or nodes above requesting node in the rack will respond with an IP ICMP echo response packet that will have 1 subtracted from its IP TTL value every time it passes a network bridge (for example, the bridge itself is in software on each system).

At block 350, the last node to receive the echo packet transmits (echos) the packet back to the original requesting node. Then according to block 360, the requesting node calculates the topology of the nodes. Specifically, the requesting node subtracts the TTL value in the received echo packet from the origin value of the TTL packet. In other words, the computer system can now calculate a hop count and the topology of all systems above or below itself in the rack by subtracting the TTL value in the received IP packet from the predefined TTL value in the packet sent.

By way of illustration, assume computer system A is the requesting node. This system sends a packet with a TTL value of 64 to computer system B. System B, in turn, transmits the packet to computer system C, which transmits the packet to computer system D, which transmits the packet to computer system E. Since each computer system subtracts one from the TTL value, this value will be 60 after reaching computer system E. The value of 60 signifies that four computer systems are linked in a network path to computer system A. When computer system A receives the packet back from computer system A, computer system A calculates that four bridges were encountered. Since each bridge is located in one computer system, four computer systems were encountered during the transmission of the echo packet Computer system A now knows that four other computer systems are also in the rack. If the echo packet were sent out the upstream link port, then computer system A knows that four other computer systems are located above it. On the other hand, if the echo packet were sent out the downstream link, then computer system A knows that four other computer systems are located below it.

In one embodiment, the echo packet can be transmitted periodically (for example, at regular time intervals, such as once every few seconds or less). The echo packet can also be initiated from an administrator or managing computer. Further, in one embodiment, the each computer system in the rack sends an echo packet to the other computer systems.

Once the topology of the computer system is determined, this topology can be used in a variety of methods and systems, such as being stored in memory, transmitted to another computer or computer system, displayed or sent to a user or administrator, used in an application for depicting a mapping of the computer, etc.

Detecting topology of systems installed in a rack can be a difficult task to do without special hardware. Exemplary embodiments, however, do not require any special hardware besides network bridges that are often implemented in software and running on the systems themselves (with an uplink and downlink port to connect neighbor systems). By using the TTL bit field of the Internet Protocol network packets, exemplary embodiments use already present network infrastructure that is left unused for bridged networks. By using IP ICMP echo packets, exemplary embodiments use standard network technologies that are present on many different types of computer systems.

Figure 4:
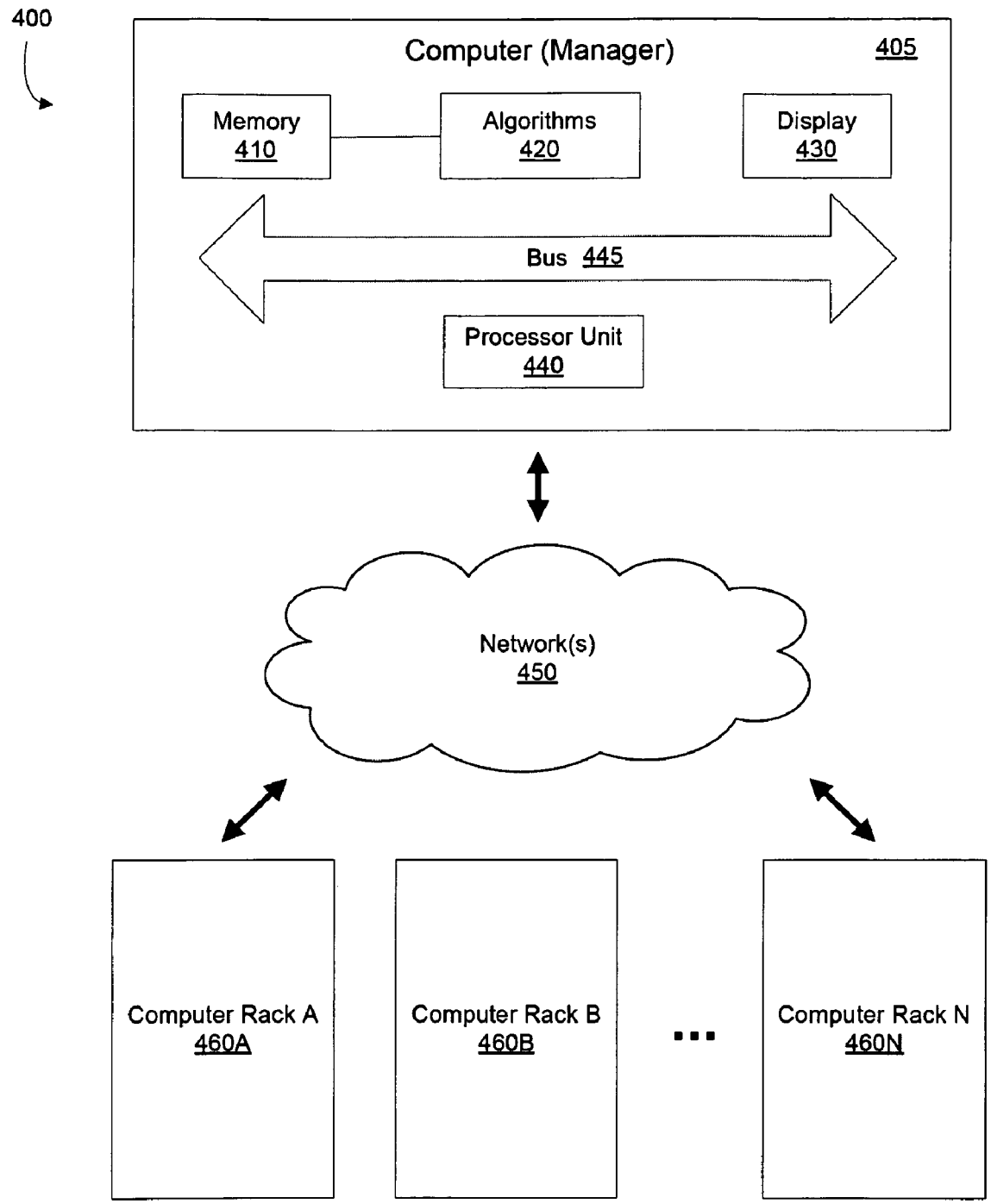
FIG. 4 is an exemplary computer system in accordance with an exemplary embodiment of the present invention.

FIG. 4 is an exemplary computer system 400 in accordance with an exemplary embodiment for being or utilizing one or more of the computers, methods, flow diagrams and/or aspects of exemplary embodiments in accordance with the present invention. In one embodiment, the computer system 400 includes a manager or computer 405 that includes memory 410, algorithms 420, display 430, processing unit 440 and one or more buses 445. The computer 405 connect to one or more computer racks 460 (shown as computer racks 460A, 460B, . . . 460N) through one or more networks 450 (such as a LAN or Wide Area Network, WAN). By way of example, the computer system 400 is a data center housing a plurality of computer racks 460A-460N.

In one embodiment, the processor unit includes a processor 440 (such as a central processing unit, CPU, microprocessor, application-specific integrated circuit (ASIC), etc.) for controlling the overall operation of memory 410 (such as random access memory (RAM) for temporary data storage, read only memory (ROM) for permanent data storage, and firmware). The memory 410, for example, stores applications, data, programs, algorithms (including software and/or firmware to implement or assist in implementing embodiments in accordance with the present invention) and other data. The processing unit 440 communicates with memory 410 and display 430 via one or more buses 445.

Embodiments in accordance with the present invention are not limited to any particular type computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

Definitions: As used herein and in the claims, the following words and terms are defined as follows:

A "bridge" or "network bridge" is a device in a computer network that connects multiple nodes or network segments at the data link layer (i.e., layer that transfers data or packets between nodes). A bridge connects two segments of a local area network (LAN) together.

As used herein, a "blade" or "blade server" is a standardized electronic computing module that is plugged in or connected to a computer or storage system. A rack or blade enclosure provides various services, such as power, cooling, networking, various interconnects and management service, etc for blades within an enclosure. Together the individual blades form a blade system. The enclosure (or chassis) performs many of the non-core computing services found in most computers. Further, many services are provided by the enclosure and shared with the individual blades to make the system more efficient.

A "hop count" is a number of legs, devices, or nodes that are traversed by a packet between its source and destination.

The terms "hot swappable" or "hot-plug" or "hot-swapping" mean the ability to remove and replace an electronic component of a machine or system while the machine or system continues to operate.

The "Internet Control Message Protocol" or "ICMP" is one of the protocols of the Internet protocol suite and is used by an operating systems (OS) of a networked computer to send messages.

A "node" is a device in a computer network where messages are created, received, or transmitted. Examples of nodes include, but are not limited to, computers, blades, servers, switches, routers, and other networked devices.

A "packet" is a formatted discrete block of data that is transmitted between nodes over a data link in a computer network. The discrete blocks of data include control information and user data (also known as payload). The control information is typically located in the header portion and provides data the computer network needs to deliver the payload (for example, source and destination addresses, error detection codes, etc.).

The word "port" logically means an interface between a component and a link (i.e., a communication path between two devices or nodes), and physically means a group of transmitters and receivers located on a chip that define a link.

A "time-to-live" or "TTL" is a value in a bit field of a packet that is modified (for example, decremented).

In one exemplary embodiment, the TTL is an 8-bit field in the Internet Protocol (IP) header. Traditionally, the TTL was a limit on a period of time or a number of iterations or transmissions in a computer and computer network that a unit of data (for example, a packet) can experience before the unit of data is discarded. Some computer systems use the value in this field as an upper bound on the time that an IP packet can exist in an internet system. The TTL field is set by the sender of the packet, and reduced by every host on the route to its destination. If the TTL field reaches zero before the packet or datagram arrives at its destination, then the packet or datagram is discarded and an error packet or datagram is sent back to the sender. TTLs avoid a situation in which an undeliverable packet or datagram keeps circulating on an internet system. In one exemplary embodiment, the TTL field is reduced by one on every hop. Thus, unlike traditional computer systems, exemplary embodiments modify the TTL bit field so bridges in the computer systems can incrementally reduce the value at each hop. The network bridges (for example, bridges 255 shown in FIG. 2) are modified to subtract 1 from the TTL value when the bridge routes the packet to the next or neighboring computer system.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps can be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein (such as being implemented in a server or controller). The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known tangible storage media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in tangible physical memory or media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    transmitting an Internet Protocol (IP) packet having a Time-to-live (TTL) bit field with a TTL value from a requesting node to a plurality of receiving nodes;
    decreasing the TTL value at each of the receiving nodes; and
    transmitting the IP packet back to the requesting node that compares a value in the TTL bit field with the TTL value to determine a number of the receiving nodes that received the IP packet and that are connected to the requesting node.

2. The method of claim 1, wherein a comparison of the value in the TTL bit field with the TTL value determines a hop count which is a number of legs, devices, and nodes that are traversed by the IP packet between the requesting node and the plurality of receiving nodes.

3. The method of claim 1 further comprising, forwarding the IP packet from a software network bridge in a first receiving node to a software network bridge in a second receiving bridge.

4. The method of claim 1 further comprising, modifying a software network bridge in each of the receiving nodes to subtract a value of one from the TTL value when the IP packet is received.

5. The method of claim 1 further comprising, subtracting the value in the TTL bit field from the TTL value to determine a hop count that indicates a number of servers connected in a daisy-chain to the requesting node.

6. The method of claim 1, wherein the requesting node and receiving nodes are servers located in a computer rack.

7. The method of claim 1 further comprising, periodically sending IP packets from each of the receiving nodes to all other nodes to determine the topology of the receiving nodes.

8. A Non-transitory computer readable storage medium having instructions for causing a computer to execute a method, comprising:
    sending a packet having a bit field with a Time-to-live (TTL) value from a first computer system to plural computer systems;
    modifying, with a network bridge in each of the plural computer systems, the TTL value at each of the plural computer systems; and
    sending the packet back to the first computer system that evaluates a value in the bit field with the TTL value to determine a hop count of the packet through the plural computer systems connected to the first computer system, wherein the hop count is a number of legs, devices, and nodes that are traversed by the packet between the first computer system and the plural computer systems.

9. The Non-transitory computer readable storage medium of claim 8 further comprising, sending the packet from an upstream port in the first computer system to a downstream port in a second computer system, the first and second computer systems located in a same rack.

10. The Non-transitory computer readable storage medium of claim 8 further comprising, decreasing the TTL value by one at each of the plural receiving computer systems.

11. The Non-transitory computer readable storage medium of claim 8, wherein the packet is an Internet Protocol (IP) Internet Control Message Protocol (ICMP) echo packet.

12. The Non-transitory computer readable storage medium of claim 8 further comprising:
    sending the packet from an upstream port of the first computer system to the plural computer systems located above the first computer system;
    sending a second packet from a downstream port of the first computer system to other plural computer systems located below the first computer system;
    evaluating the packet and second packet at the first computer system to determine a number of servers located in a computer rack.

13. The Non-transitory computer readable storage medium of claim 8, wherein the first computer system and the plural computer systems are connected to each other in a daisy-chain configuration in a computer rack.

14. The Non-transitory computer readable storage medium of claim 8, wherein the network bridge is software that is modified to decrease the value of the TTL value.

15. The Non-transitory computer readable storage medium of claim 8 further comprising, periodically sending echo packets from each of the plural computer systems to each other to determine a topology.

16. A computer system, comprising:
    a requesting server; and
    plural receiving servers coupled to the requesting server;
    wherein the requesting server transmits an Internet Protocol (IP) packet having a Time-to-live (TTL) bit field with a TTL value to the plural receiving servers that decrease the TTL value before transmitting the IP packet to another server;
    wherein the requesting server compares a value in the TTL bit field with the TTL value to determine a number of the plural receiving servers that are connected to the requesting server in the computer system.

17. The computer system of claim 16, wherein the IP packet is an echo packet that is transmitted back to the requesting server.

18. The computer system of claim 16, wherein the requesting server and plural receiving servers are stacked in a rack.

19. The computer system of claim 16, wherein each of the plural receiving servers and the requesting server has a modified software bridge that subtracts a value of one from the TTL bit field.

20. The computer system of claim 16, wherein the requesting server and the plural receiving servers are connected in a daisy-chain connection.

* * * * *